July 7, 1970     J. R. MEADE     3,519,230
CHRISTMAS TREE HOLDER AND SUPPORT
Original Filed April 25, 1967
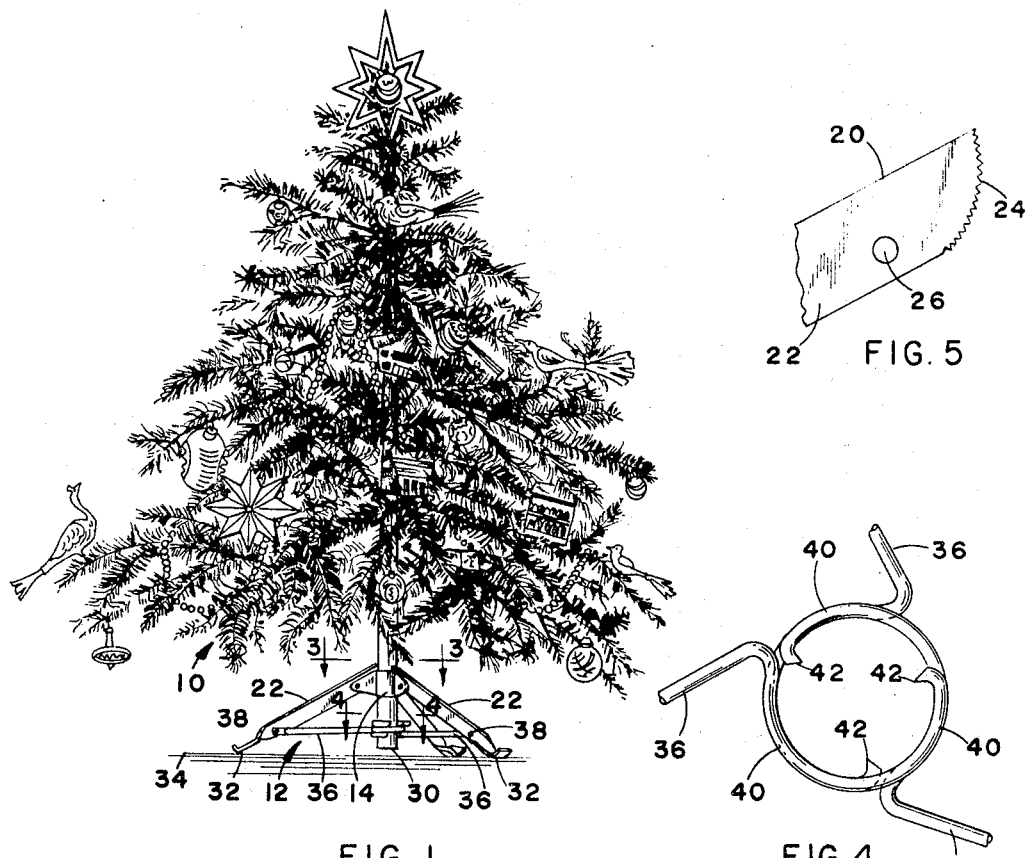
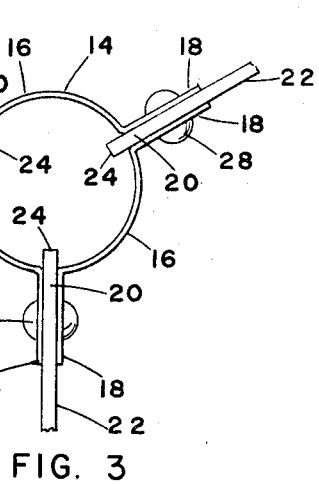
INVENTOR
JAMES R. MEADE
BY
ATTORNEY

United States Patent Office 3,519,230
Patented July 7, 1970

---

3,519,230
CHRISTMAS TREE HOLDER AND SUPPORT
James R. Meade, 302 Newington Drive,
Hatboro, Pa. 19040
Original application Apr. 25, 1967, Ser. No. 633,520, now Patent No. 3,454,246, dated July 8, 1969. Divided and this application Dec. 26, 1968, Ser. No. 796,260
Int. Cl. A47g 33/12
U.S. Cl. 248—47
3 Claims

ABSTRACT OF THE DISCLOSURE

A holder to support a Christmas tree vertically and braced at two vertically spaced locations by circumferentially spaced legs pivoted to collar means and having cam surfaced means at one end to engage said trunk by said cam surfaces with increasing firmness as said legs are moved outward and upward at the outer ends relative to engaging a horizontal supporting surface, and bracing means connected to said legs intermediately of the ends thereof engage a lower portion of said tree trunk than the cam means engage as the legs move outward as aforesaid to support the tree braced in vertical position.

---

This application is a division of Ser. No. 633,520, filed Apr. 25, 1967, now Pat. No. 3,454,246, dated July 8, 1969.

BACKGROUND OF THE INVENTION

Many types of Christmas tree holders are available, but primarily are for use with natural trees. In recent years, the advent of various type of artificial trees has produced certain problems with respect to Christmas tree holders suitably engaging the trunks of artificial trees which, in general, are of two principal types. One type comprises a wooden trunk of uniform diameter, at least at the base end, and provided with inwardly and downwardly extending holes at spaced locations thereon for purposes of receiving the inner ends of artificial branches. Another very popular type of artificial tree comprises a trunk which is formed of tubular metal, of uniform diameter at least at the lower portion thereof and having metal foil type branches or the like suitably affixed to the trunk.

Both types of the trunks of the artificial trees referred to above, in general, are of a smaller diameter at the lower ends thereof than the corresponding lower ends of the trunks of natural trees of corresponding size, whereby many types of conventional tree holders presently available are not readily capable of holding such trunks of artificial Christmas trees, particularly in a manner that results in relatively little marking or disfiguring of the trunks, whereby such artificial trees may be used for a number of years if carefully stored between seasons.

Among the rather substantial number of existing patents on Christmas tree holders, the following have been selected as representative of the type presently available.
1,273,639, Lyons, 1918; 1,497,683, Hall, 1924; 2,014,896, Hollander, 1935; 2,028,129, Allerton, 1936; 2,679,994, Mellen, 1954; 2,689,701, Whitaker, 1954; 2,727,708, Lorenzen, 1955; 2,909,344, Dutton, 1959.

SUMMARY OF THE INVENTION

The present invention comprises a Christmas tree holder and support primarily adapted to receive and be connected to the lower end portions of the trunks of several different types of artificial Christmas trees, particularly those of which at least the lower portions of the trunks are of uniform diameter and generally smaller than the diameters of the trunks of corresponding sizes of natural trees. Essentially, these embodiments of tree holders and supports comprise collar-like means which receive a portion of the artificial tree trunk spaced upwardly from the terminal lower end thereof, and bracing means are arranged to engage the tree trunk at a still lower location, whereby the trunk is engaged at vertically spaced locations to effect adequate bracing of the tree against tilting or falling.

A plurality of outwardly and downwardly extending legs are pivotally connected adjacent the upper ends thereof to said collar-like means and said ends of the legs are provided with gradually spiralled cam surfaces which frictionally engage the trunk of the tree effectively and with progressive pressure, while the legs extend outward and downward from said collar-like means, said legs being spaced therearound at circumferentially even distances. The bracing means are connected to the legs intermediately of the ends thereof and extend inward from the legs to engage a portion of the trunks of the trees below that engaged by said cam surfaces.

In particular, the bracing means are for use with artificial or natural wooden trunks of Christmas trees. The bracing means include sharpened spikes which project into the trunks a limited distance to provide effective, though limited, attachment to the trunk of a tree during use. The weight of the tree tends to move the lower ends of the legs outwardly and thereby more firmly engage the prong means with the trunk, which also results in self-centering of the tree relative to the vertically spaced means of the holder and support which firmly engage and interlock with the lower portion of the trunk of the tree.

DESCRIPTION OF THE DRAWINGS

FIG. 1 is a side elevation of an exemplary artificial Christmas tree, the lower end of the trunk of which is illustrated as being supported by one embodiment of holding and support means made in accordance with the principles of the present invention.

FIG. 2 is an enlarged, perspective view of the embodiment of holding and support means illustrated in FIG. 1 and shown in engagement with a fragmentary portion of an exemplary trunk of an artificial tree illustrated in phantom.

FIG. 3 is a fragmentary, still further enlarged top plan view of the collar-like means of the embodiment of tree holder shown in FIGS. 1 and 2, as seen on the line 3—3 of FIG. 1;

FIG. 4 is a view similar in scale to FIG. 3, but illustrating, fragmentarily, in plan view, portions of the embodiment of bracing means of the type shown in FIGS. 1 and 2, as seen on the line 4—4 of FIG. 1.

FIG. 5 is a side elevation of a fragmentary upper portion of one of the legs of the embodiment shown in the preceding figures.

DESCRIPTION OF THE PREFERRED EMBODIMENTS

Referring to FIG. 1, an exemplary Christmas tree 10 is shown therein supported in one embodiment of tree holding and support means 12, hereinafter referred to as a tree holder. Although the several embodiments of tree holders described hereinbelow and illustrated in the drawing which embody the principles of the invention have been designed primarily for use with artificial trees having at least the lower portions of the trunks of uniform diameter, at least the embodiment of the invention illustrated in FIGS. 1–5 may be used with natural trees, if the diameters of the lower portions of the trunks are of such size as to be accommodated therein.

The tree holder 12 shown in FIG. 1 comprises collar-like means which, essentially, comprises a plurality of similar segments 16, which are arcuate and have similar ears 18 on opposite ends thereof which extend radially outward from the arcuate segments 16. Adjacent ears 18 on the related segments are parallel to each other for receiving, pivotally, therebetween the normally upper ends 20 of legs 22.

In side elevation, the terminal surfaces of the upper ends 20 of the legs 22 each comprise a segment of a spiral cam surface 24 which is somewhat parabolic and, preferably, is finely serrated, transversely, as illustrated in exemplary manner in FIG. 5. The center of the spiral 24 approximately is coincident with the pivot hole 26 through which, preferably, a rivet 28 extends, opposite ends thereof being similarly headed for purposes of pivotally and permanently connecting the legs 22 between the ears 18 of the collar-like segments 16 for ease of operation of the legs as described hereinafter.

From the foregoing construction, due to the segments 16 being permanently connected together by the rivets 28, they comprise a composite sleeve structure which is slightly larger in diameter than the lower portion 30 of the trunk of the trees 10 intended to be supported thereby. In the construction of the invention illustrated in FIGS. 1–5, it is preferred that the tree 10 is of an artificial type of which the trunk is formed of wood. At least the lower portion 30 of said trunk is of uniform diameter which preferably fits relatively closely within the collar-like means 14.

With such an arrangement, when the outer and lower extremities 32 of legs 22, which preferably are rounded for engagement with a horizontal surface 34 such as a floor, the weight of the tree normally is sufficient to move the outer ends of legs 22 outwardly and upwardly so as to bring the upper portions of the spiral cam surfaces 24 progressively into firmer frictional engagement with the trunk 30 of the tree 10. Because the trunk is formed of wood, the serrations of the cam surfaces 24 will at least partially bite into the exterior surface of the trunk of the tree so as to enhance firm gripping engagement of the legs with the trunk and thereby support the trunk of the tree substantially vertically to the floor surface 34, for example.

For purposes of holding the tree vertically upright, the tree holder 12 includes bracing means, details of which are best shown in FIGS. 1, 2 and 4. Such bracing means comprises a plurality of similar links 36. The outer ends thereof are pivotally connected to the legs 22, intermediately of the ends thereof, by pin means such as rivets 38 which extend through complementary, aligned holes in the legs 22 and preferably flattened end portions in the links 36. Said links effectively may be formed from wire stock of suitable gauge. The opposite ends 40 of links 36 are shaped arcuately preferably so that each of said ends 40 extend more than 180° around trunk 30 of the tree, terminating in a sharpened prong 42.

As illustrated particularly in FIG. 2, it will be seen that said arcuate opposite ends 40, when placed in operative position with respect to the lower portion of trunk 30, at a position below that which is within the collar-like means or engaged by cams 24, at least partially overlap each other and, as viewed in FIG. 4, it will be seen that the same cooperate to completely encircle the trunk 30 of the tree and center it relative to the holder. Further, as the outer end portions 32 of the legs 22 are moved outwardly, the sharpened prongs 42 will project at least slightly into the surface of the trunk 30 of the tree and thus effectively hold the bracing links 30 substantially in horizontal position, as viewed in FIG. 1. Thereby, the holder self-centers the tree which is supported in substantially vertical position and the weight of the tree upon the tree holder will cause the holder to interlock with the tree and maintain the same in this relationship with respect to the tree, when in use, at all times.

It will be seen from the foregoing that the arrangement of the invention described above is capable of being quickly assembled with respect to artificial trees, as well as for use with natural trees. Such construction is capable of automatic engagement with the trunks of the trees due to the cam action which provides frictional engagement at one location upon the trunks, while cooperating bracing means engage another location of the trunk at a position below the first position, thereby affording effective bracing of the tree against tilting and maintaining support thereof in a vertical manner. No tools are required to effect the connection of the tree holders with respect to the trunks of the trees and yet firm clamping engagement is effected by said spiral cam surfaces as the lower ends of the legs are moved outward into final supporting position, which movement simultaneously places the lower supporting means in operative position with respect to a lower portion of bottom end of the trunk of the tree to prevent tilting thereof from a desired vertical position.

While the invention has been described and illustrated in its preferred embodiment, it is to be understood that the invention is not to be limited to the precise details herein illustrated and described since the same may be carried out in other ways falling within the scope of the invention as shown and described.

I claim:

1. Holding and support means arranged to engage the lower portion of the cylindrical trunk of a Christmas tree to support the same substantially vertically and comprising in combination, collar-like means arranged to extend around the trunk portion of a tree above its lower terminal end, a plurality of similar legs spaced circumferentially evenly around said collar-like means, means pivotally connecting said legs adjacent one end thereof to said collar-like means to permit the opposite end of each leg to extend radially outward and downward from said collar-like means for even engagement with a horizontal supporting surface, said one end of each leg having similar cam surfaces respectively engaging said tree trunk progressively more firmly as said legs are pivotally swung outward from the tree trunk about said pivot means, and rigid unitary rod-like bracing links respectively pivotally connected at one end to each leg intermediately of the ends thereof and operable in use to extend horizontally inward toward each other, the opposite ends of said links having curved portions engaging and partially surrounding the lower end portion of said tree trunk in closely overlapping relationship with each other below the portion thereof engaged by said cam surfaces and thereby centering said trunk and interlocking therewith and maintaining said tree substantially vertical relative to said supporting surface.

2. The tree holding and support means according to claim 1 in which said cam surfaces are provided with relatively fine serrations to enhance the frictional engagement of the same with the trunk of a tree and the curved portions of said links being rigid therewith and terminating in prongs extending radially toward said trunk in use and operable to at least lightly penetrate said tree trunk to prevent accidental displacement of said bracing means with respect to said trunk.

3. The tree holding and support means according to claim 2 in which said links are formed from wire and rivet means pivotally connect one end of each link to one of said legs and said curved portions of said links extending through an arc appreciably in excess of 180° to afford ready positioning of said portions in operative relationship with each other and the trunk of a tree.

References Cited

UNITED STATES PATENTS

| 1,729,129 | 9/1929 | Seelav | 248—47 |
| 2,908,461 | 10/1959 | Coffeen | 248—44 |

ROY D. FRAZIER, Primary Examiner

F. DOMOTOR, Assistant Examiner

U.S. Cl. X.R.

248—173